(12) United States Patent
Cooke et al.

(10) Patent No.: US 7,330,629 B2
(45) Date of Patent: Feb. 12, 2008

(54) FIBER OPTIC UNIVERSAL BRACKET APPARATUS AND METHODS

(75) Inventors: Terry L. Cooke, Hickory, NC (US); John B. Johnson, Taylorsville, NC (US); James P. Luther, Hickory, NC (US); Alan W. Ugolini, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 108 days.

(21) Appl. No.: 11/216,767

(22) Filed: Aug. 31, 2005

(65) Prior Publication Data

US 2007/0047897 A1    Mar. 1, 2007

(51) Int. Cl.
*G02B 6/00*    (2006.01)

(52) U.S. Cl. ............... 385/136; 385/134; 385/137; 385/139

(58) Field of Classification Search ............... 385/134, 385/136, 137, 139
See application file for complete search history.

(56) References Cited

U.S. PATENT DOCUMENTS

2005/0111809 A1*  5/2005  Giraud et al. ............... 385/135

* cited by examiner

*Primary Examiner*—Frank G. Font
*Assistant Examiner*—Derek L. Dupuis
(74) *Attorney, Agent, or Firm*—Keith A. Roberson

(57) ABSTRACT

A bracket assembly includes a bracket including a flexible hinge, and a furcation assembly attached to the bracket.

4 Claims, 6 Drawing Sheets

FIBER OPTIC UNIVERSAL BRACKET APPARATUS AND METHODS

BACKGROUND OF THE INVENTION

1. Field of the Invention

The present invention relates generally to a fiber optic assembly, and more particularly, to fiber optic Universal Bracket methods and apparatus to facilitate the routing of cable in a communications network.

2. Technical Background

Optical fiber is increasingly being used for a variety of broadband applications including voice, video and data transmissions. As a result, fiber optic communications networks include a number of interconnection points at which multiple optical fibers are interconnected. Fiber optic networks also include a number of connection terminals, examples of which include, but are not limited to, network access point (NAP) enclosures, aerial closures, below grade closures, pedestals, optical network terminals (ONTs) and network interface devices (NIDs). In certain instances, the connection terminals include connector ports, typically opening through an external wall of the terminal, that are used to establish optical connections between optical fibers terminated from the distribution cable and respective optical fibers of one or more pre-connectorized drop cables, extended distribution cables, tether cables or branch cables, collectively referred to herein as "drop cables." The connection terminals are used to readily extend fiber optic communications services to a subscriber. In this regard, fiber optic networks are being developed that deliver "fiber-to-the-curb" (FTTC), "fiber-to-the-business" (FTTB), "fiber-to-the-home" (FTTH) and "fiber-to-the-premises" (FTTP), referred to generically as "FTTx."

In telecommunication infrastructure installations, such as, for example, an FTTx installation, equipment for switching, cross-connecting, and inter-connecting a plurality of various devices and/or techniques are used to fasten multi-fiber trunk cables to a rack, a connector housing, or within a man hole. Many of this equipment can be simple devices such as a ty-wraps, Velcro, or tape that is used to fasten an epoxy plug furcation or a cable to the installed communications equipment racks or in a connector housing. The connector housings allow the craftsperson to perform desired maintenance and/or reconfigure the communication network if desired. However, the known solutions for fastening with Velcro and ty-wraps can be cumbersome.

Therefore there is an unresolved need for a universal bracket that facilitates the craftsperson quickly fastening and/or quickly unfastening the epoxy plug furcation to the connector housings.

SUMMARY OF THE INVENTION

In one aspect, a bracket assembly includes a bracket including a flexible hinge, and a furcation assembly attached to the bracket.

In another aspect, a tether assembly for a fiber optic cable is provided. The tether assembly includes a tether cable having a first end adapted to be attached to the fiber optic cable and a second end, the tether cable containing a plurality of optical fibers optically connected to a corresponding plurality of optical fibers accessed and terminated from the fiber optic cable, a furcation at the second end of the tether cable for separating the optical fibers of the tether cable and transitioning the optical fibers into at least one furcation leg, the furcation leg having a first end attached to the furcation and a second end, at least one individual connector port at the second end of the furcation leg for providing access to at least one of the plurality of optical fibers of the tether cable optically connected to the plurality of optical fibers accessed and terminated from the fiber optic cable, and an integration component attached to a housing of the connector port, wherein the integration component is configured to be attached to a bracket.

In another aspect, a product line includes a first furcation plug shell configured to be employable in a data center, a second furcation plug shell configured to employable in at least one of a pedestal and a below grade box, and an integration component configured to be attachable to both of the first and second furcation plug shells.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof.

DETAILED DESCRIPTION OF THE PREFERRED EMBODIMENTS

Figure 1:
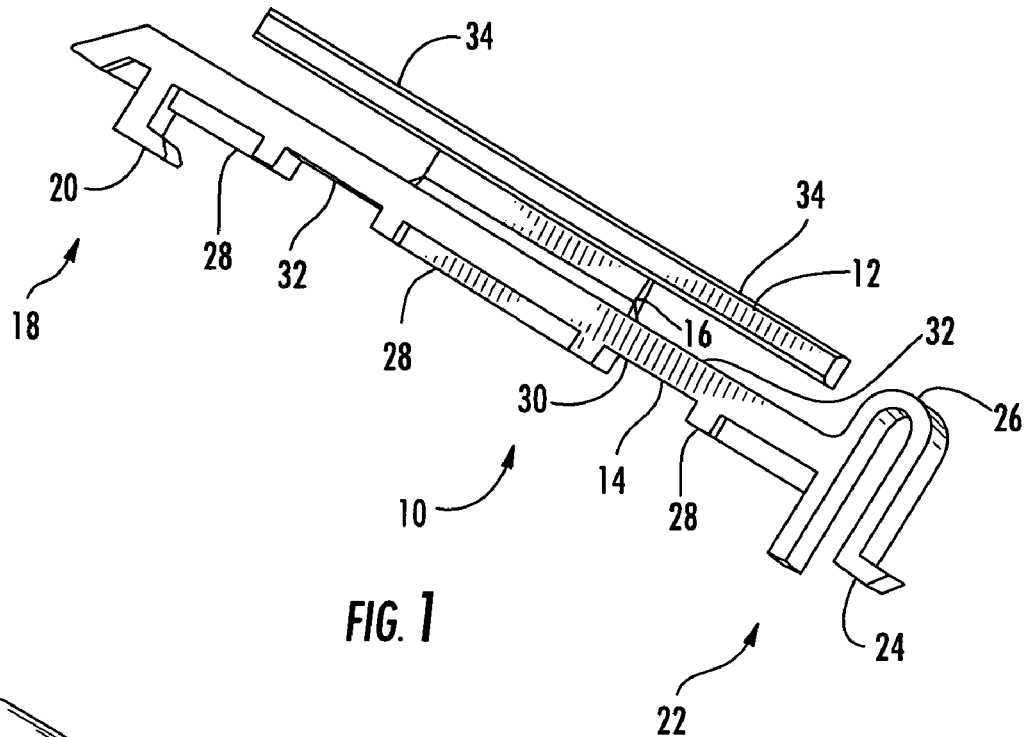
FIG. 1 illustrates an integration component.

Reference will now be made in detail to the present preferred embodiments of the invention, and examples of which are illustrated in the accompanying drawings. Whenever possible, the same reference numerals will be used throughout the drawings to refer to the same or like parts.

FIG. 1 illustrates an integration component 10 including a key 12 extending from a body 14 via a stand off member 16 centrally disposed on body 14. On a first end 18 is a first locking member 20. On a second end 22 distal first end 18 is a second locking member 24. An arcuate portion 26 allows for second locking member 24 to be deflected toward first end 18 as explained below with reference to FIGS. 4 and 5. As illustrated in FIG. 1, locking member 24 is deflectable while locking member 20 is non-deflectable. However, in one embodiment, both locking members 20 and 24 can be deflectable. A plurality of strengthening members 28 extend on one side 30 of body 14. Located between adjacent support members 28 are a plurality of fastener openings 32 on body 14. Aligned with openings 32 are a plurality of fastener openings 34 on key 12. Typically, component 10 is molded from plastic and is relatively lightweight and relatively inexpensive. However, component 10 could be constructed from material other than plastic.

Figure 2:
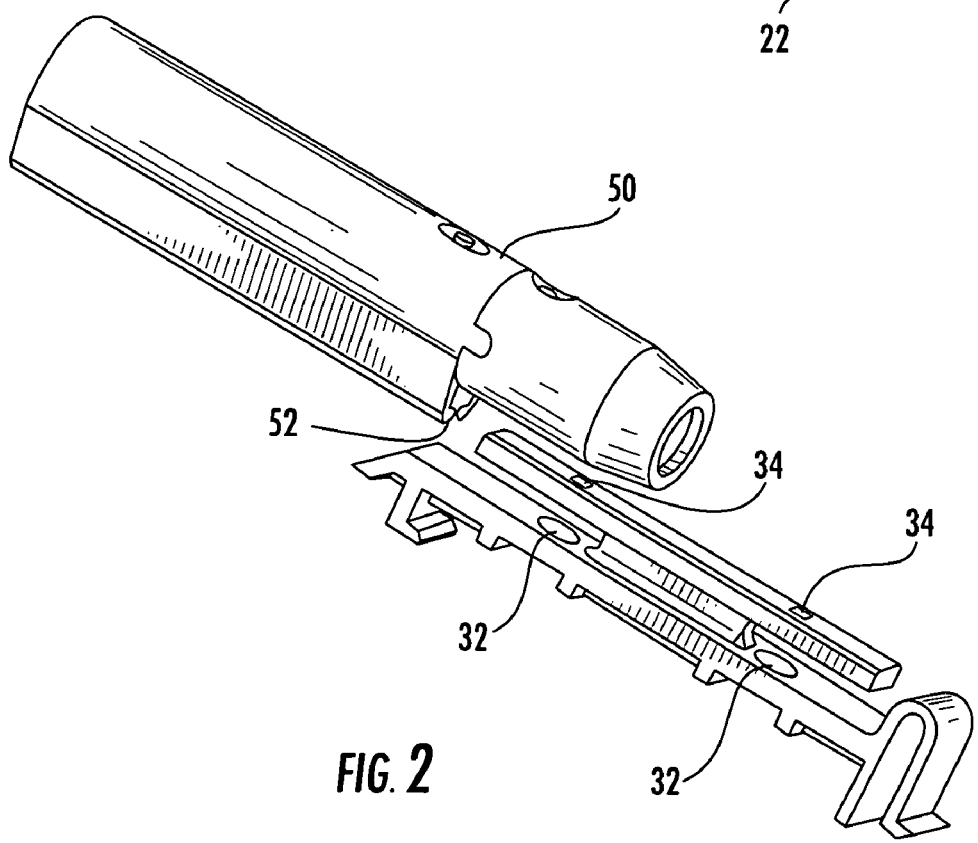
FIG. 2 illustrates a furcation plug shell.

FIG. 2 illustrates a furcation plug shell 50 positioned to be mounted to component 10. Furcation plug shell 50 includes a slot 52 sized to receive key 12.

Figure 3:
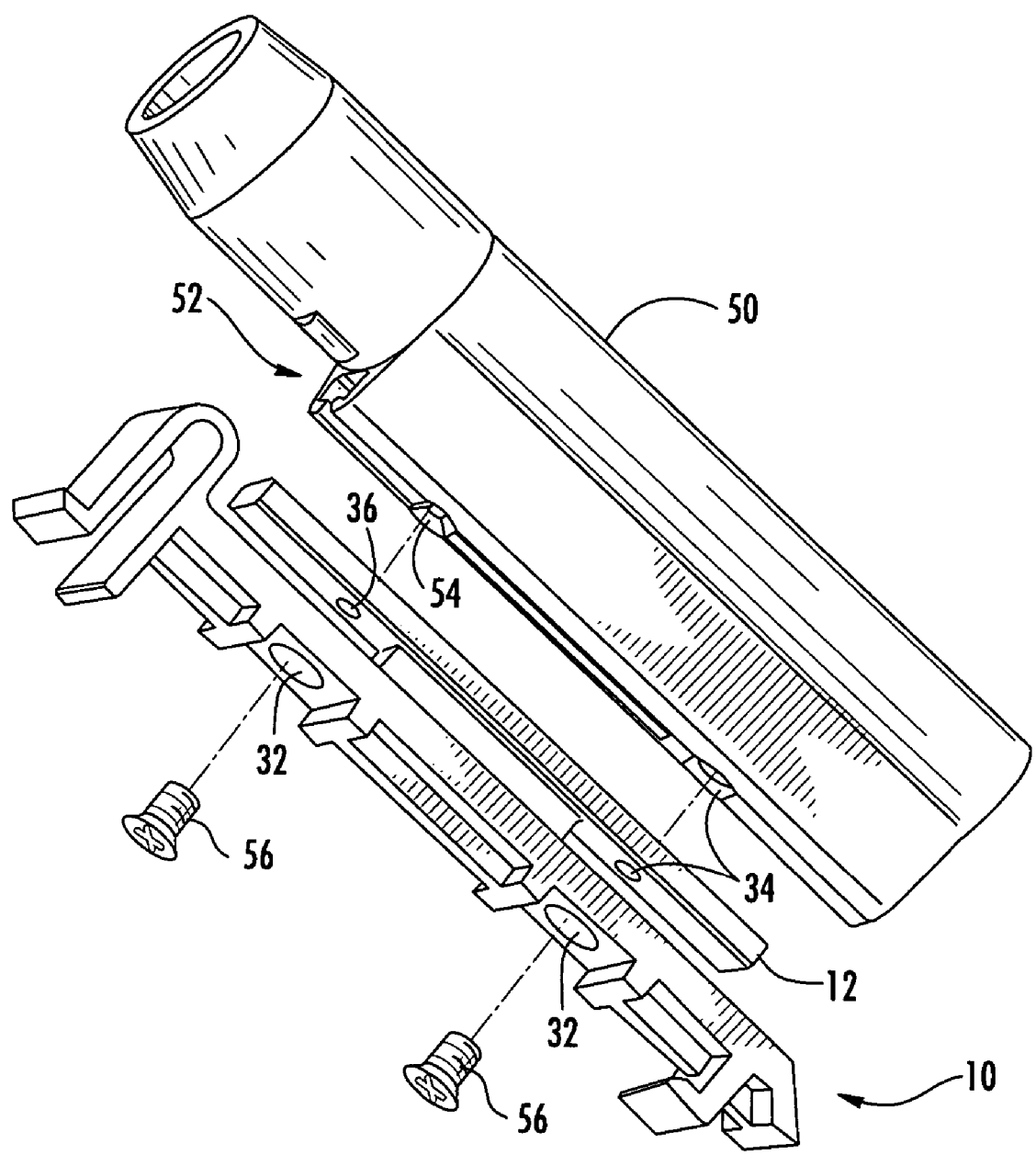
FIG. 3 illustrates that the furcation plug shell of FIG. 2 includes a plurality of fastener openings.

FIG. 3 illustrates that furcation plug shell 50 includes a plurality of fastener openings 54. In one embodiment, openings 34 are threaded to receive screws 56 such that screws 56 pass though openings 32 first, openings 54 second, and then engage openings 34 to attach furcation plug shell 54 to component 10. Alternatively, fasteners other than screws could be used and openings 32, 34, and 54 can be variably sized to accommodate the non-screw fasteners.

Figure 4:
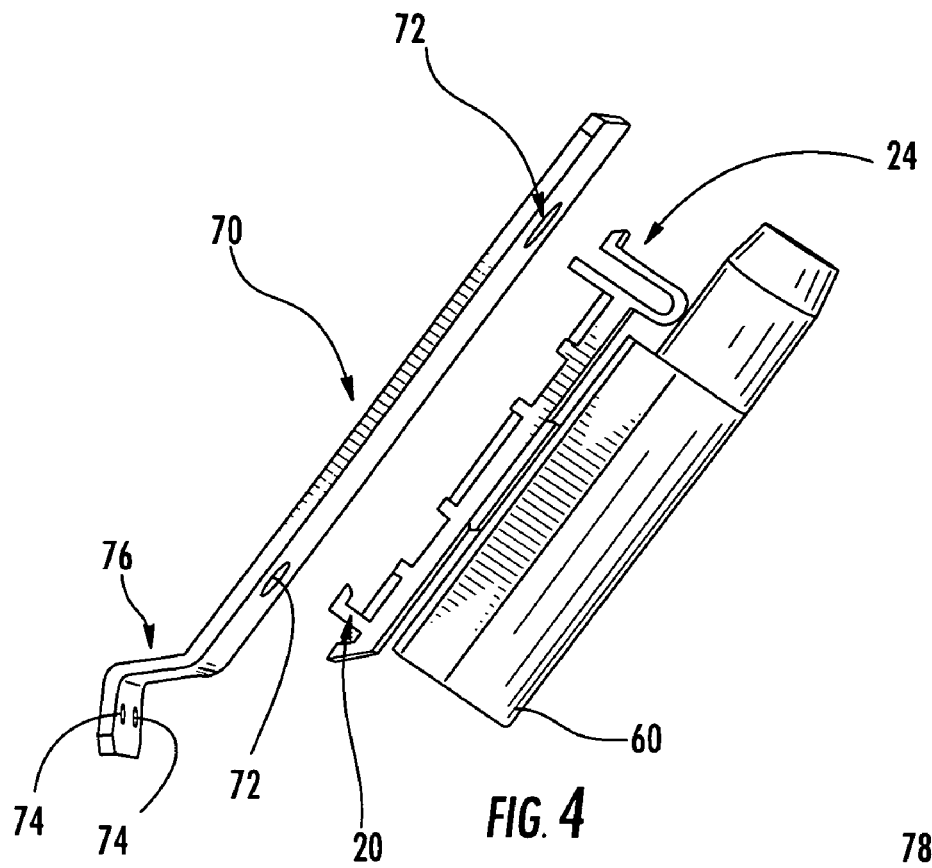
FIG. 4 illustrates the integration component of FIG. 1 and the furcation plug shell of FIGS. 2 and 3 attached together forming a furcation assembly.

FIG. 4 illustrates integration component 10 and furcation plug shell 50 attached together forming a furcation assembly 60, wherein furcation assembly 60 is positioned to be mounted to a bracket 70 including a plurality of engagement openings 72. Bracket 70 also includes a plurality of fastening openings 74 and a flexible hinge 76.

Figure 5:
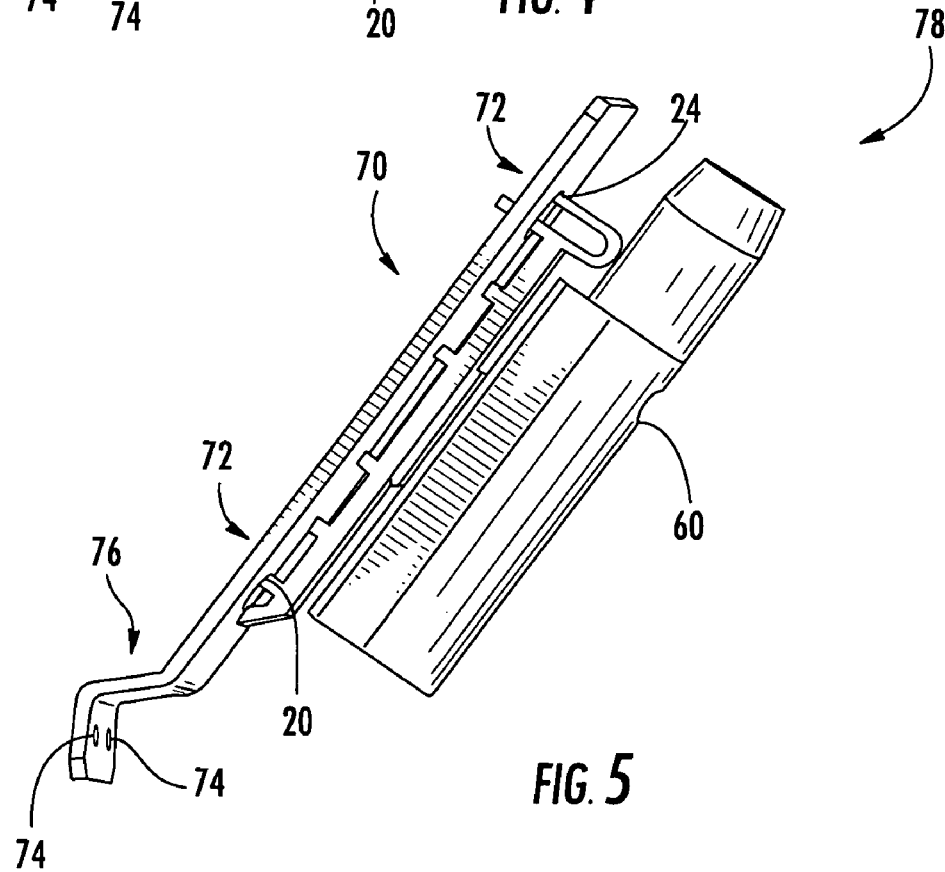
FIG. 5 illustrates a bracket with the furcation assembly of FIG. 4 attached.

FIG. 5 illustrates bracket 70 with furcation assembly 60 attached, wherein first locking member 20 and second locking member 24 engage openings 72. A user compresses second locking member 24 and inserts both first and second locking members 20 and 24 through openings 72, and then releases the compression allowing second locking member 24 to resiliently return to its uncompressed form which attaches assembly 60 to bracket 70.

FIG. 5 illustrates assembly 60 attached to bracket 70 and held together by first and second locking members 20 and 24. Together assembly 60 and bracket 70 form a bracket assembly 78.

Figure 6:
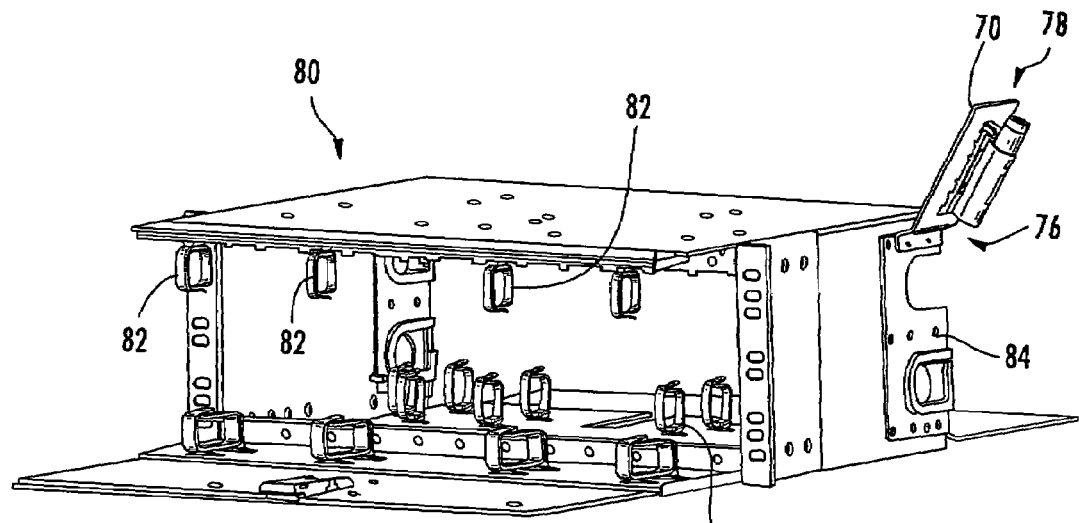
FIG. 6 illustrates a connector housing for a communications network (not shown).

FIG. 6 illustrates a connector housing 80 for a communications network (not shown). Connector housing 80 is typically employed in a data center environment. Connector housing 80 includes a plurality of routing guides 82 positioned thereon. Bracket assembly 78 is mounted on an entry plate assembly 84. Flexible hinge 76 allows a user to move bracket assembly 78 in a counter-clock (A in FIG. 7) direction, and a clock-wise direction (B in FIG. 7). Additionally the hinge allows for upward and downward motion.

Figure 7:
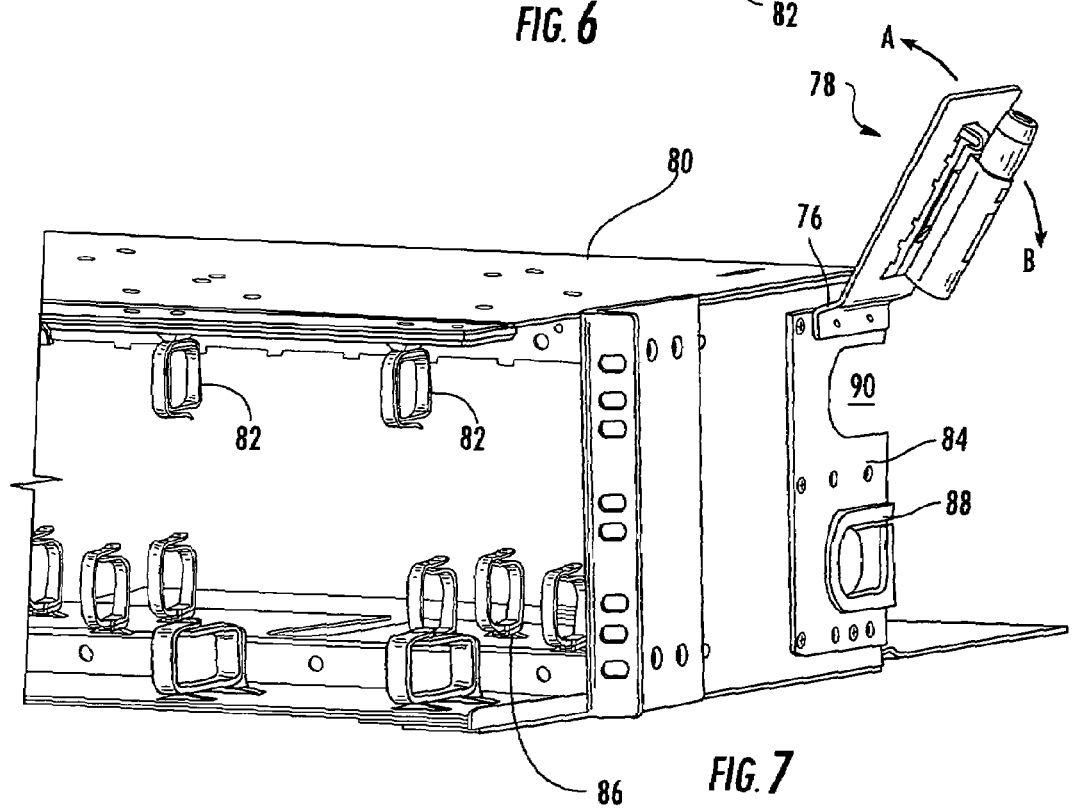
FIG. 7 is an enlarged view illustrating a portion of the connector housing of FIG. 6.

FIG. 7 is an enlarged view illustrating a portion of connector housing 80 and a fastener 86. Connector housing 80 may also advantageously include at least one grommet 88. Also, cable entry plate assembly 84 is removable so that a large number of smaller diameter cables can enter connector housing 80 from the side, rather than a small number of larger diameter cables. In other embodiments, a cable entry plate is not an assembly having grommets, but instead is merely a removable cable entry plate.

Additionally, a grommet may be placed in an upper port 90. A plurality of cables are respectively secureable and strain relievable at bracket assembly 78. From there (bracket assembly 78), the cable proceeds to cable entry plate assembly 84 to enter an interior space of connector housing 80. Grommet 88 is soft and flexible, thereby inhibiting the cable from chaffing against a rigid edge. In this case, cable entry plate assembly 84 includes one grommet 88 so that multiple cables may enter a single side of connector housing 80. Moreover, cables may enter the connector housing from the top, the bottom, or both. If a cable was entering from below, a strain relief bracket assembly is attachable near the bottom of the connector housing side panel. With cable entry plate assemblies 84 attached, connector housing 80 is suitable for either a small number of larger diameter cables entering through grommets 88 or a relatively limited number smaller diameter cables entering through grommets 88. However, connector housing 80 may have more capacity for organizing and housing optical connections than can be provided in cables that can enter through grommet 88. And therefore grommet 88 is removable to allow for more cables to enter housing 80 with grommet 88 removed than in place.

In use, bracket assembly 78 facilitates enabling a craftperson to quickly organize, route, and store optical connections such as splices or connections in connector housing 80. Additionally, flexible hinge 76 facilitates the craftsperson in performing maintenance and or reconfiguring the communication network as desired.

Figure 8:
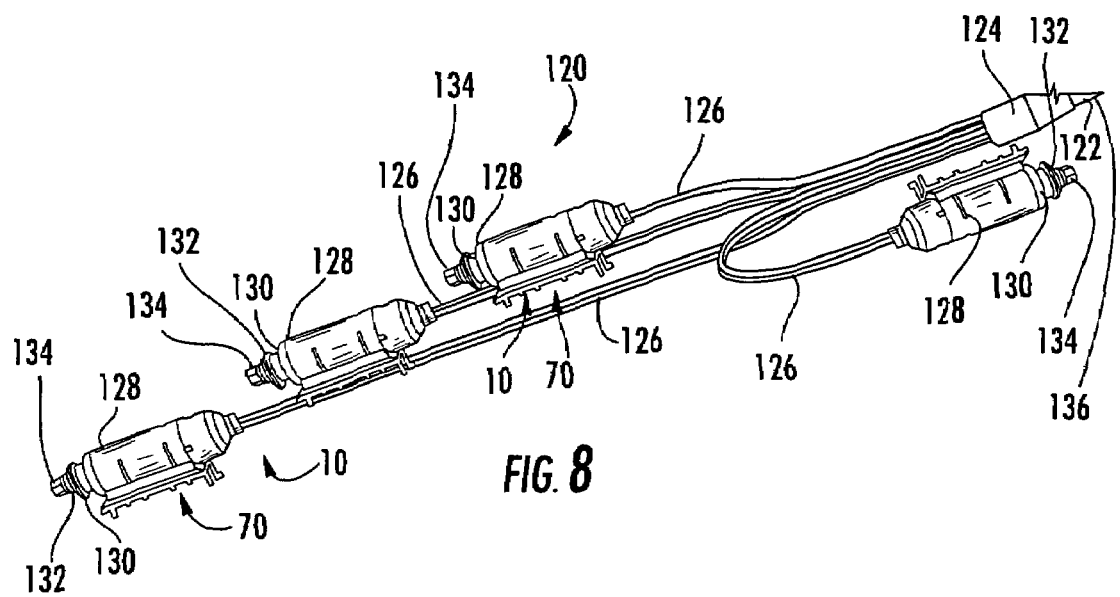
FIG. 8 illustrates a tether assembly.

FIG. 8 illustrates a tether assembly 120 similar to the tether assembly (20) described in co-pending application Ser. No. 11/003,102 filed Dec. 3, 2004 and hereby incorporated in its entirety. Tether assembly 120 includes a preselected or customized length of a tether cable 122 adapted to be attached to a distribution cable (not shown) at a mid-span access location. In this exemplary embodiment, tether cable 122 contains a plurality of optical fibers and terminates in a furcation 124 that separates the optical fibers within the tether cable 122 into a plurality of individual connector ports 128. Each connector port 128 provides access to at least one optical fiber of tether cable 122 that is interconnected with at least one optical fiber terminated from a distribution cable at a mid-span access location. An integration component 10 is attached to a housing of each connector port forming a plurality of furcation assemblies 60, wherein the connector housing is the furcation plug shell 50. Furcation assemblies 60 can then be mounted to a bracket in the field. Moreover, furcation assemblies 60 can then be mounted to bracket 70 forming bracket assemblies 78 in the field. Furcation assemblies 60 can be placed in a pedestal, in a below ground box, or in an aerial installation (all are non-data center environments). But the tethers shown in FIG. 7 are not used in the data center environment. Therefore, integration component allows for creating a furcation assembly that is configured to be mounted to a bracket in both a data center environment and a non-data center environment. The use of a single integration component allows for reduced inventory costs and facilitates the craftsperson making the connections easily and properly.

As shown in FIG. 8, each connector port 128 comprises a receptacle 130 operable for receiving an optical connector mounted upon the end of an optical fiber routed to receptacle 130 through a furcation leg 126 of tether assembly 120 and a plug 132 of a connectorized fiber optic cable, such as a branch cable or a drop cable, referred to generically hereinafter as a drop cable 134. Connector port 128, and in particular receptacle 130, provides access to one or more connectorized optical fibers of tether cable 122 that are optically connected to optical fibers accessed and terminated at the mid-span access location of the distribution cable. Connector ports 128 may be used to readily interconnect an optical fiber of connectorized fiber optic drop cable 134 with a terminated optical fiber of the distribution cable at a desired location in a fiber optic communications network. As used herein, the term "connector port" is intended to broadly include any component provided at the free end of a furcation leg 126 of the tether assembly that facilitates optical connection of an optical fiber of the tether cable 22 to an optical fiber of the connectorized drop cable 134. In the exemplary embodiments shown and described herein, the connector port 128 comprises a receptacle 130, a plug (42 in FIGS. 3-5 of co-pending application Ser. No. 11/003,102) and a fiber optic connector (96, 97 in FIGS. 8 and 9 of co-pending application Ser. No. 11/003,102). However, the connector port 128 may also comprise a factory-installed adapter or connector alignment sleeve positioned within the receptacle 130 or a field-installed adapter or connector alignment sleeve (e.g., alignment means 46 shown in FIGS. 3 and 4 of co-pending application Ser. No. 11/003,102) for aligning and maintaining mating connectors in opposing physical contact. In various embodiments, the connector port 128 further provides an environmental seal at the optical connection between the optical fiber of the furcation leg 126 and the optical fiber of the drop cable 134. The connector port 128 may also serve to strain relieve the furcation leg 126 and/or the drop cable 134 by transferring any tension load applied to the furcation leg 126 and/or the drop cable 134 to the structure (e.g., housing) of the connector port 128 in a known manner.

The tether cable 122 may be any fiber optic cable having a preselected or customized length and containing one or more optical fibers. As shown, the tether cable 122 comprises a tubular jacket or sheath 136 adapted to be attached to the distribution cable at a mid-span access location and configured to route and protect the optical fibers between the distribution cable and the furcation 124. The furcation 124 comprises a rugged body that is secured to the downstream end of the tether cable 122. At least one, and preferably a plurality, of individual furcation legs 126 are secured within the body of the furcation 124 by an epoxy material in a known manner to form a conventional furcation plug. The furcation legs 126 may be any type of fiber optic jacket, sheath or cable containing one or more optical fibers of the tether cable 122. As shown, each furcation leg 126 comprises a tubular body that is attached to the tether cable 122 at the furcation 124 and in which one or more optical fibers of the tether cable 122 are routed and protected. In one example, 900 micron optical fibers are routed and protected within a tubular body having a greater diameter, such as 0.002 inches (2 mil). The individual furcation legs 126 may have the same preselected or customized length, or may have varying lengths so as to stagger the connector ports 128 along the length of the distribution cable and thereby reduce the combined diameter of the tether assembly 120 and distribution cable. In this manner, a distribution cable assembly having a "low profile" may be deployed through a conduit having a relatively small inner diameter or significant bends, or over conventional aerial lashing equipment. In one embodiment, the upstream end of the tether cable 122 is attached to the distribution cable at a mid-span access location and the tether assembly 120 (e.g., tether cable 122 and furcation legs 126) are removably or slideably strapped to the distribution cable in the factory such that the tether assembly 120 may be slid along the length of the distribution cable or removed from the distribution cable after deployment in the field.

In another embodiment, the connector port 128 may be overmolded around its respective furcation leg 126 and the furcation 124 may be overmolded around the furcation legs 126 and tether cable 122 in order to provide a rugged and sealed (i.e., moisture impervious) assembly for use in an outdoor environment. Overmolding may also be used to attach the upstream end of the tether cable 122 to the distribution cable at the mid-span access location. The overmolding process, also known as "injection molding", involves preparing the sheath 136 of the tether cable 122 and the furcation legs 126 in a manner well known in the art, such as by cleaning and roughening, flame preparing or chemically preparing the surface to promote friction and adhesion with the overmolding material. The receptacles 130, including their respective optical connectors and optical fibers, the furcation legs 126 and the downstream end of the tether cable 122 are suspended within a suitable overmolding tool and the overmolding material is poured or injected into the overmolding tool so that the overmolding material surrounds and encapsulates the receptacles 130, furcation legs 126 and the downstream end of the tether cable 122. In alternative embodiments, a protective layer, such as, but not limited to, a foil made of tin or aluminum, may be used to protect the receptacles 130, furcation legs 126 and tether cable 122 prior to overmolding. However, other materials may be used to protect the underlying components prior to overmolding, provided that the material is capable of being shaped to conform to the outer profile of the components.

Once the components have been appropriately protected, if desired, and positioned within a first portion of the overmolding tool, a second portion of the overmolding tool may be joined to the first portion to form an internal cavity for receiving the overmolding material. Suitable examples of overmolding materials include, but are not limited to, polyurethanes, silicone and like rugged, yet flexible materials. The overmolding materials are poured or injected into the internal cavity defined by the overmolding tool. The overmolding material provides a protective shell, maintains sealing integrity and is preferably capable of withstanding crush forces up to at least about 300 lbs. As a result of the overmolding process, the connector ports 128 and furcation 124 have a smooth, low-profile shape with a rounded or tapered exterior so as to avoid snagging during deployment of the distribution cable and tether assembly 120 through conduits or aerial lashing equipment.

The embodiment of the tether assembly 120 shown in FIG. 8 comprises four furcation legs 126 and connector ports 128 for optically connecting the optical fibers of the tether cable 122 to optical fibers of one or more drop cables 134. However, other embodiments have a number of furcation legs 126 other than four. The optical fibers of the tether cable 122 are in turn interconnected with the optical fibers of the distribution cable accessed and terminated at the mid-span access location. Thus, the tether assembly 120 of the present invention is operable for interconnecting terminated optical fibers of a distribution cable with optical fibers of one or more drop cables 134. While four identical furcation legs 126 and connector ports 128 are shown, it is envisioned that the tether assembly 120 may have any number of furcation legs 126 and any number of connector ports 128. It is also envisioned that each furcation leg 126 of the tether assembly 120 may terminate in more than one connector port 128. In addition, the furcation legs 126 and/or connector ports 128 may be color-coded or provided with other indicia to identify particular optical fibers of the tether cable 122, and consequently, particular terminated optical fibers of the distribution cable. Additionally, the different ports 128 may be for different types of connectors.

In use, tether assembly 120 can be easily mounted into a pedestal or a below grade box. Additionally, when integral component 10 is coupled to bracket 70, flexible hinge 76 facilitates a craftsperson easily and quickly positioning connector port 128 at a desired position.

Figure 9:
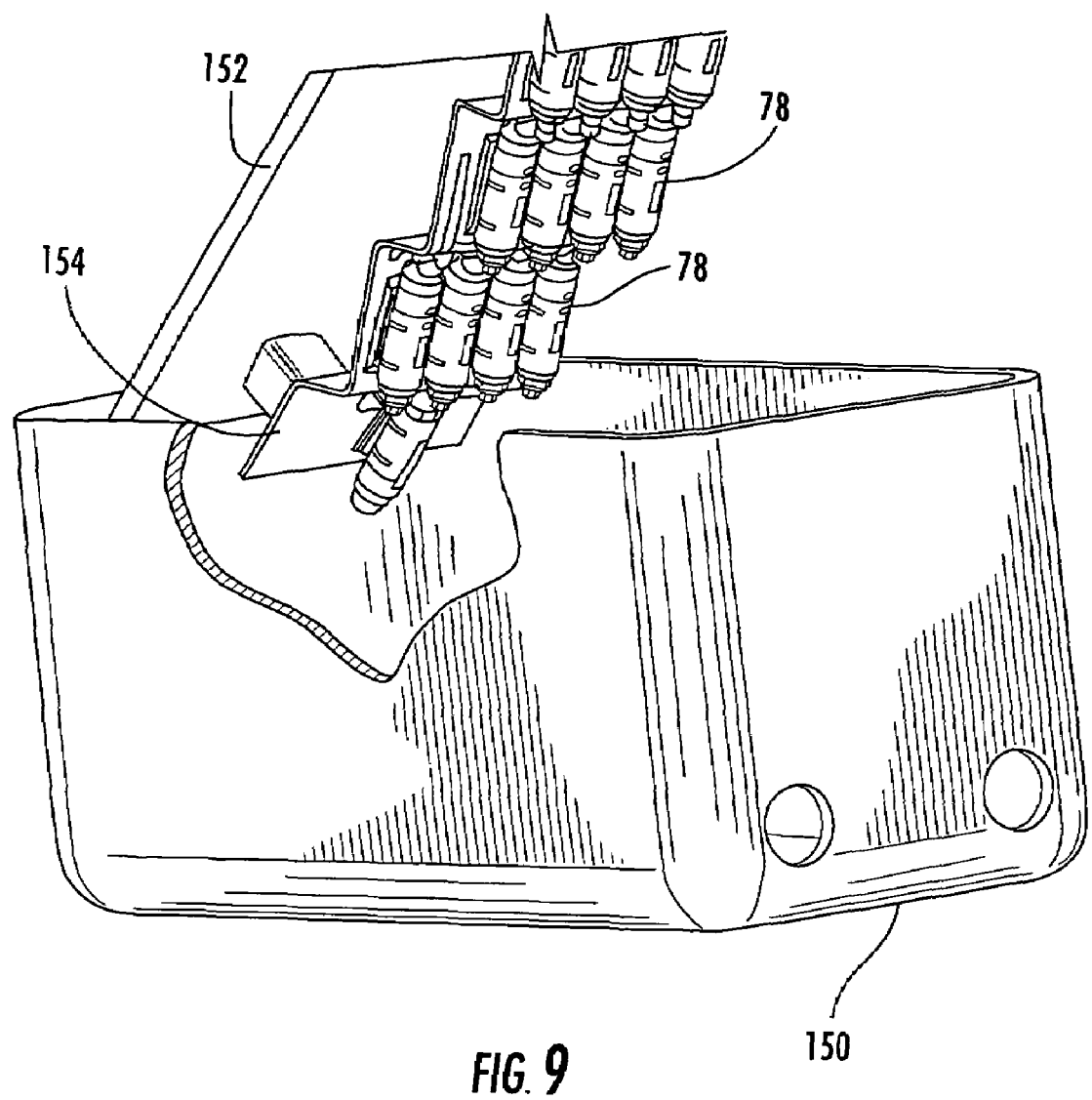
FIG. 9 illustrates a housing.

FIG. 9 illustrates a housing 150 including a cover 152 wherein a plurality of bracket assemblies 78 are mounted to a support member 154. Note that bracket assemblies 78 provide for a convenient array in a relatively small apace, and facilitate a craftsperson making modifications to a network's connections very easily. The modifications can be either making new connections or re-routing existing connections.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A bracket assembly comprising:
   a bracket comprising a flexible hinge; and
   a furcation assembly attached to said bracket, said furcation assembly comprising an integration component comprising least one deflectable locking member sized to fit in an opening on said bracket, and a furcation plug shell attached to said integration component.

2. A bracket assembly in accordance with claim 1 wherein said furcation assembly is attached to said bracket without the use of a tool.

3. A bracket assembly in accordance with claim 1 wherein said integration component comprises a body and a key extending from said body, wherein said key includes at least one threaded fastener opening, said furcation plug shell including a slot sized to receive said key.

4. A bracket assembly in accordance with claim 1 wherein said integration component comprises a body and a key extending from said body, wherein said key includes at least one threaded fastener opening, said furcation plug shell including a slot sized to receive said key.

* * * * *